April 12, 1960

E. S. BELANGER 2,932,248

AUTOMATIC BAND MARKING MACHINE

Filed Oct. 12, 1956

INVENTOR.
EDWARD S. BELANGER
BY
Salvatore G. Militano,
ATTORNEY

April 12, 1960  E. S. BELANGER  2,932,248
AUTOMATIC BAND MARKING MACHINE
Filed Oct. 12, 1956  5 Sheets-Sheet 2

INVENTOR.
EDWARD S. BELANGER
BY
Salvatore G. Militano
ATTORNEY

April 12, 1960
E. S. BELANGER
2,932,248
AUTOMATIC BAND MARKING MACHINE
Filed Oct. 12, 1956
5 Sheets-Sheet 3
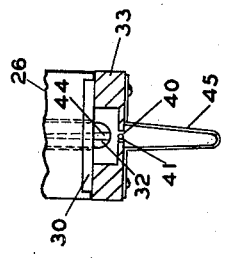
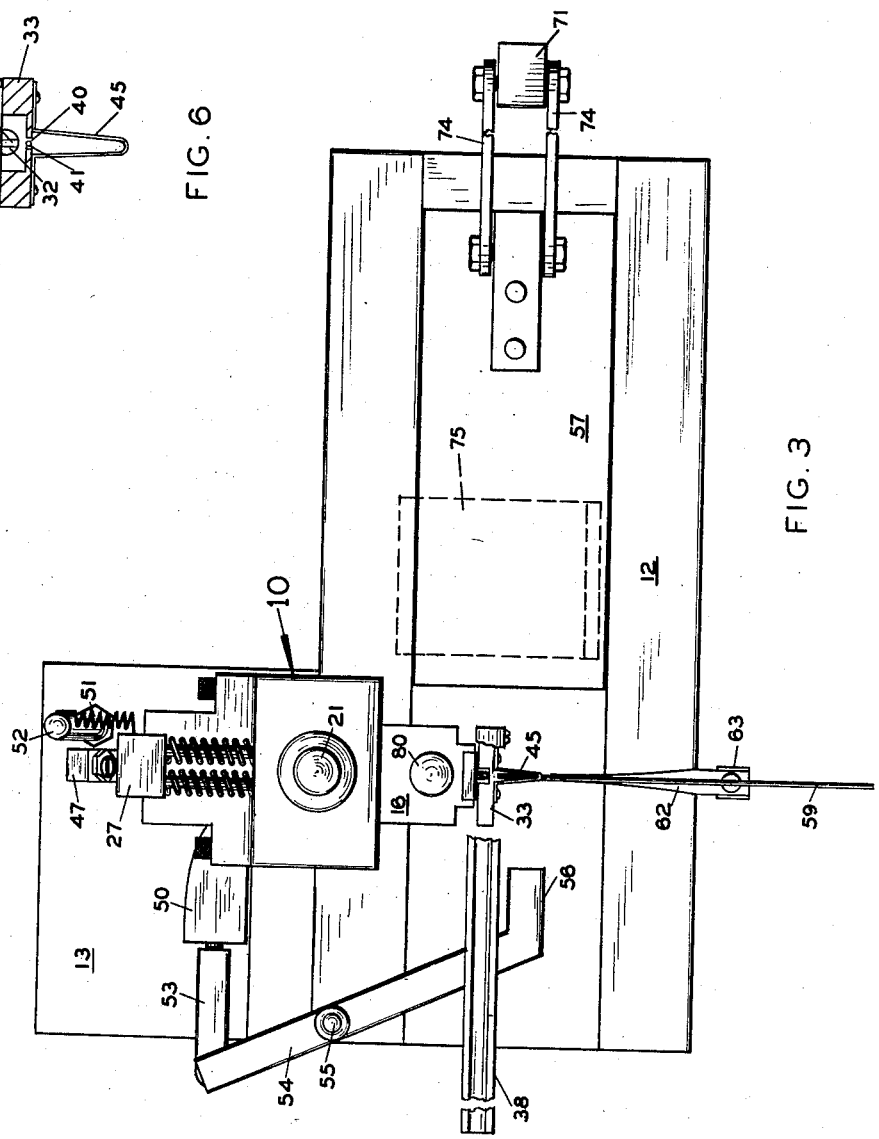
INVENTOR.
EDWARD S. BELANGER
BY
Salvatore G. Militana,
ATTORNEY

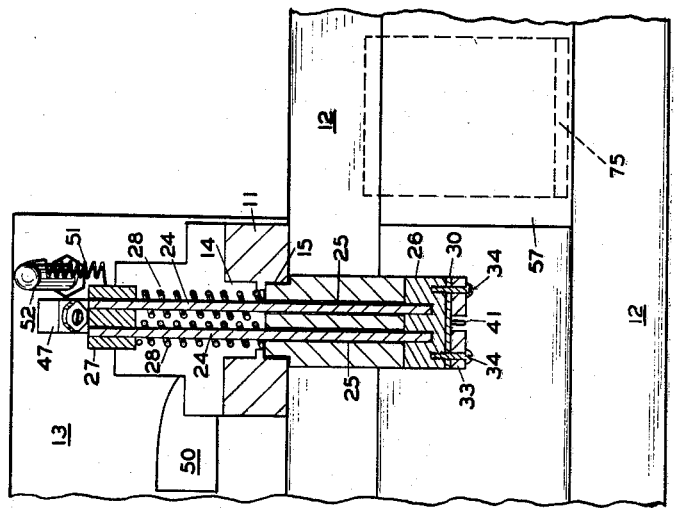
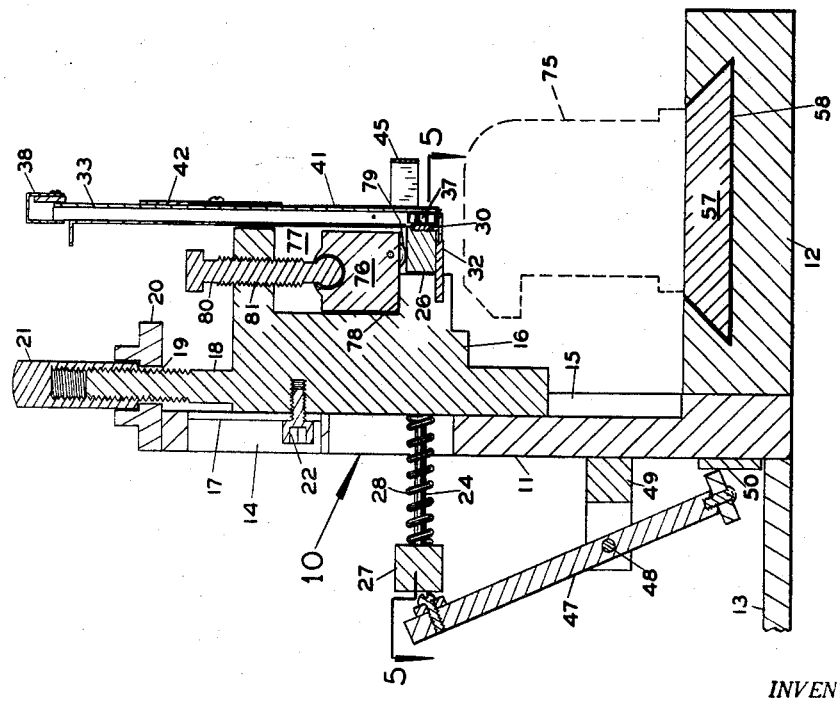
FIG. 5
FIG. 4
INVENTOR.
EDWARD S. BELANGER

United States Patent Office 2,932,248
Patented Apr. 12, 1960

2,932,248

AUTOMATIC BAND MARKING MACHINE

Edward S. Belanger, Miami, Fla.

Application October 12, 1956, Serial No. 615,614

8 Claims. (Cl. 101—4)

This invention relates to marking or stamping machines and is more particularly directed to a band marking machine.

It is a well established practice to provide a leg band for birds, both domestic and migratory for the purpose of identification, control and edification. The leg bands have imprinted thereon certain numbers and lettering which operate as a key for identifying the breeder of the bird and the birds themselves, the locality from which the bird came, and other desirable information. Realizing the necessity for such a system of identification and control, especially for the control of epidemic diseases, certain States have required breeders of birds such as parakeets, parrots, canaries and other similar pets, to place such a leg band on each bird. These metallic bands are preferably made of aluminum and placed on a bird's leg early in its infancy.

The present manner of marking leg bands is to cut or saw them from a length of a tubular member having the desired diameter. Each band is then marked by hand. This method of producing bands is laborious, expensive, while the bands produced are rough and poorly manufactured.

The present invention contemplates the manufacture of leg bands by the following method commencing with a length of rough aluminum tubing:

First, by the use of an automatic screw machine the tubing is cut into desired lengths, the inside and outside diameters are trued and both edges chamferred to remove the danger of the bands cutting a bird's leg when positioned thereon.

Second, the bands are then anodized giving them any desired color.

Third, the bands are then marked as will be described and claimed hereinafter, and fourth, paint is rubbed into the markings to permit the markings to stand out and be readily seen.

Therefore, a principal object of the present invention is to provide a simple and inexpensive device for the marking of leg bands in large quantities which are presently being marked manually.

A further object of the present invention is the manufacture of leg bands in consecutive numerical order, each positioned on a rod in its proper numerical position ready to be placed on a bird's legs.

A still further object of the present invention is the provision of a band marking machine that is automatic in operation and sufficiently flexible to permit the marking of bands of various sizes.

A still further object of the present invention is the provision of a band marking machine described as above which permits the marking of cylindrical bands without deforming the cylindrical shape of the bands.

With these and other objects in view, the invention will be best understood from a consideration of the following detailed description taken in connection with the accompanying drawings forming a part of this specification, with the understanding, however, that the invention is not confined to any strict conformity with the showing of the drawings but may be changed or modified so long as such changes or modifications mark no material departure from the salient features of the invention as expressed in the appended claims.

In the drawings:

Figure 3 is a top plan view thereof with the band receiving device shown only in part.

Figure 4 is a cross sectional view taken along the line 4—4 of Figure 2.

Figure 5 is a vertical sectional view taken along the line 5—5 of Figure 4.

Figure 6 is an enlarged sectional view taken along the line 6—6 of Figure 1.

Figure 1:
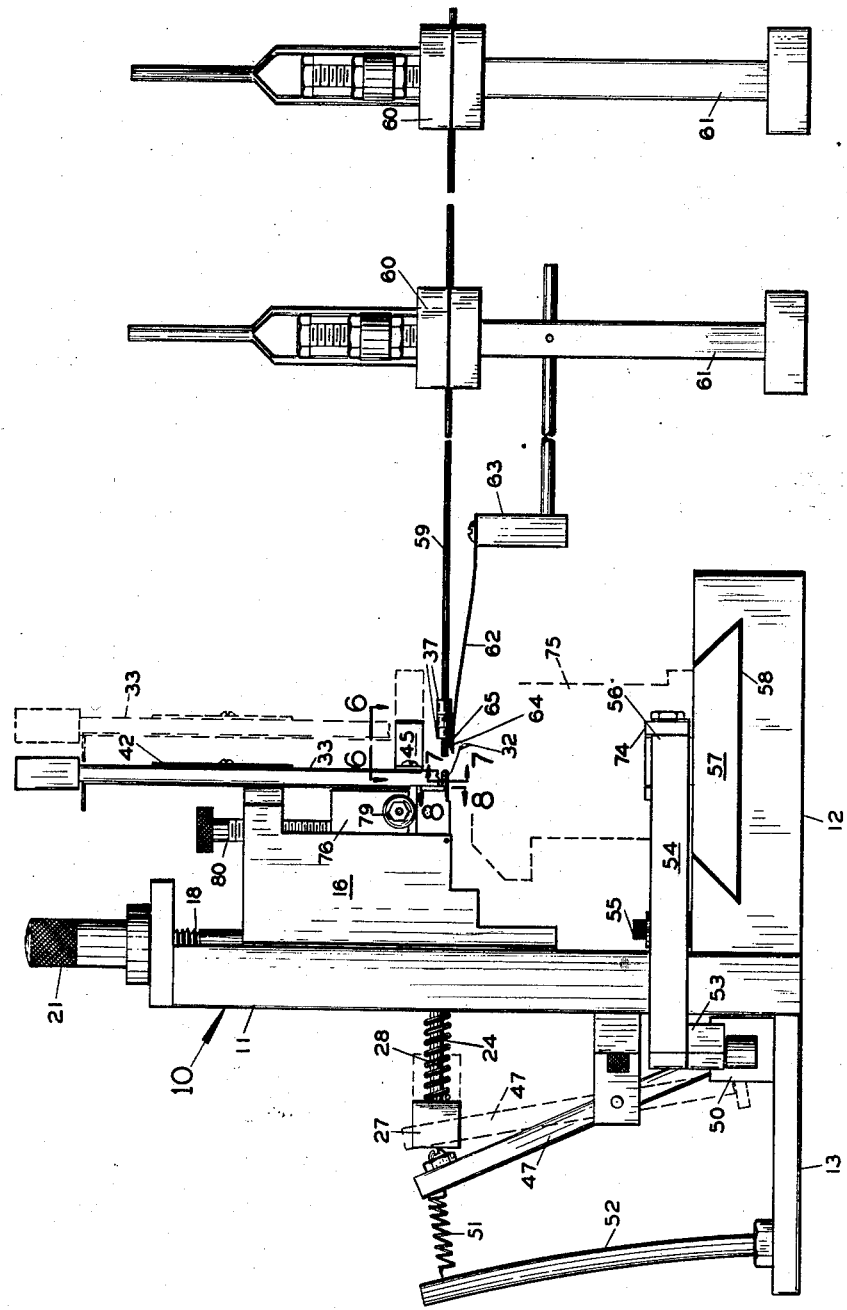
Figure 1 is a side elevational view of my band marking machine with the die holder shown removed from its carriage.
Figures 2, 7, 8:
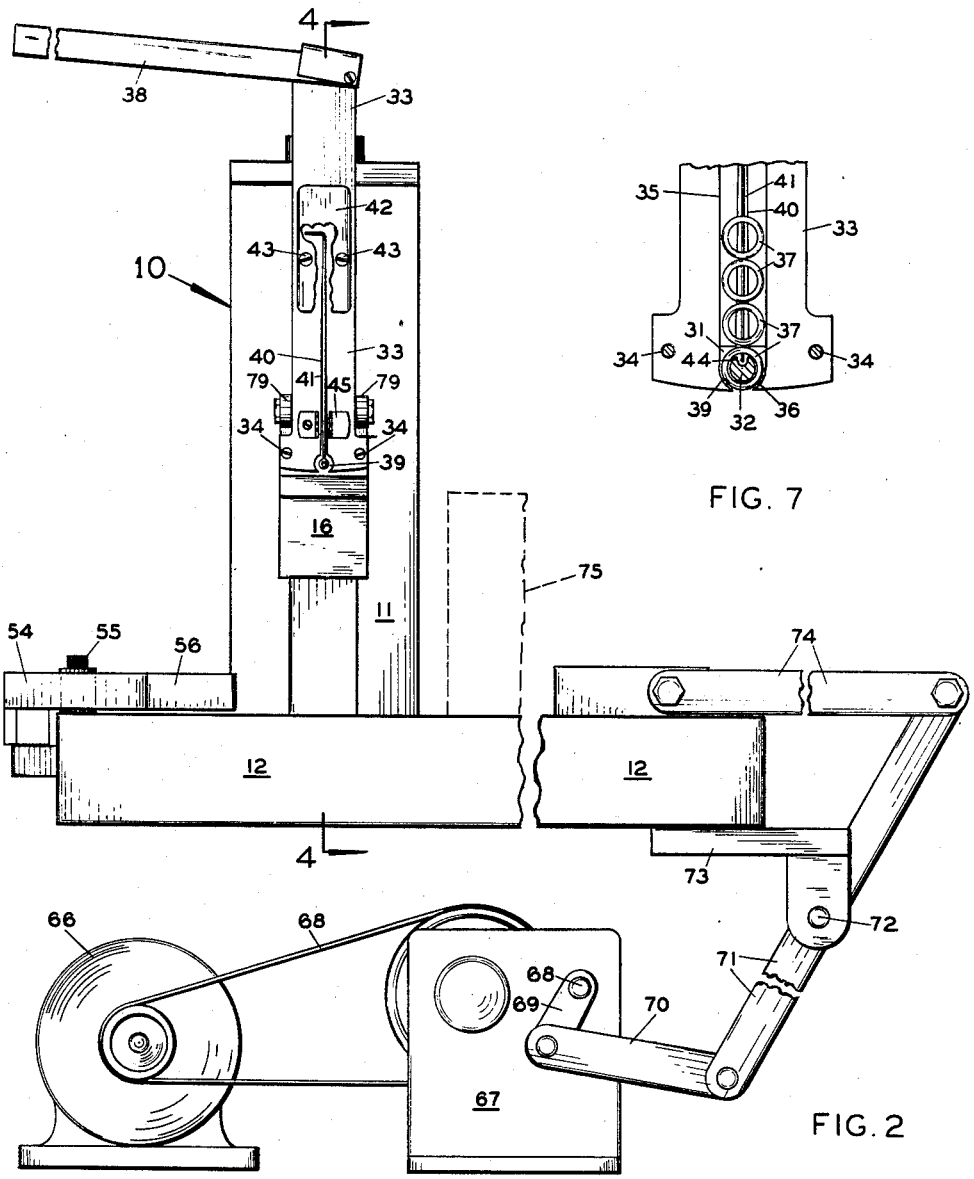
Figure 2 is a front elevational view with the die holder shown in broken lines and the band receiving mechanism removed for clarity of understanding.

Figures 7 and 8 are likewise enlarged sectional views taken along the lines 7—7 and 8—8 respectively in Figure 1.

Figure 9:
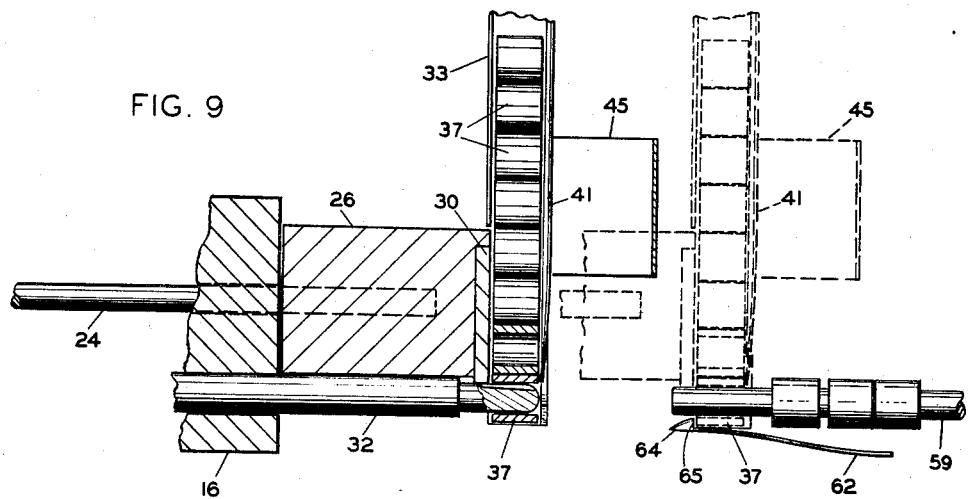

Figure 9 is a fragmentary sectional view showing the band removing mechanism in operation, the dotted line position of the chute indicating the extreme movement of the chute from its normal marking position.

Figure 10:
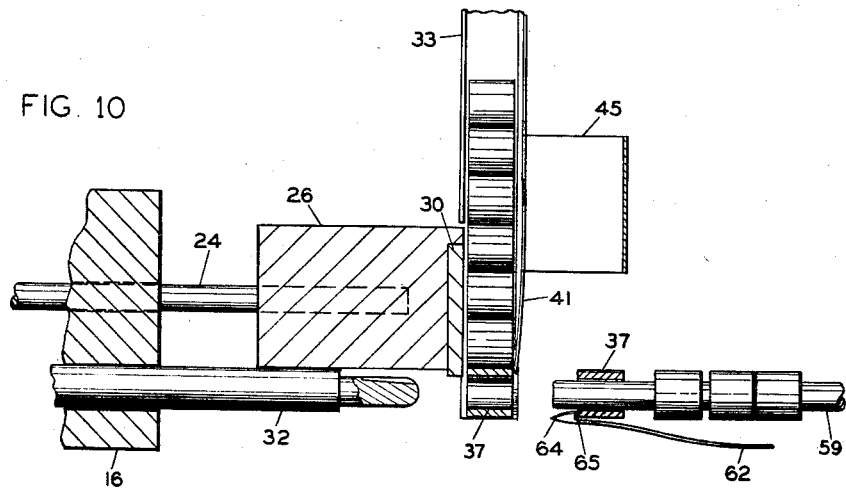

Figure 10 is a similar view showing the chute in a mid-position between those positions shown in Figure 9.

Referring to the drawings wherein like numerals are used to designate similar parts throughout the several views, the numeral 10 refers to the band marking device generally consisting of a standard or support 11 extending upwardly from a base member 12 on one side and a base member 13 on the other side to which the standard 11 is secured. The standard 11 is provided with a vertically disposed groove 14 on one side and a groove 15 on its other side in which groove 15 a band receiving head 16 is mounted by means of a bolt 22 extending through an elongated opening 17 in the groove 14. Means are provided for vertical adjustment of the head 16 on the standard 11 comprising a threaded stud 18 extending upwardly from the head 16 through a bore 19 in a collar 20 secured to the top of the standard 11. A threaded cap 21 which is adjustably mounted on the threaded stud 18 engages the collar 20 to position the head 16 at any desired height on the standard 14. On the head 16 is mounted a band support and feeding mechanism comprising a pair of horizontally disposed rods 24 extending through bores 25 in the head 16 and secured at their end by block members 26 and 27 with a spring 28 mounted on the rods 24 and extending between the head 16 and the block member 27 to yieldingly urge the block 26 into contact relation with the head 16. On the forward face of the block member 26 there is a rectangular recess 29 in which is fitted a plate member 30 whose function is described in detail hereinafter. See Figure 8. The plate member 30 is provided with an arcuate recess 31 for receiving a pin 32 extending therebelow whose other end is secured to the head 16. A band receiving and holding chute 33 which is vertically disposed is secured at its lower portion to the plate member 30 and block member 26 by screw bolts 34 which extend through the plate member 30.

In order that the chute 33 may be capable of handling bands of various sizes the chute is provided with a slot 35 large enough in width to receive the largest sized band of those to be marked without the necessity of having to change some of the parts of this device as is explained hereinafter. The slot 35 extends the full length of the chute 33, but at the extreme lower portion, the slot 35 is arcuate as at 36 to serve as a seat for the lowermost band 37 thereby preventing it from falling therethrough. An opening 39 on the forward wall 38 of the chute 33 permits the lowermost band 37 to slide therethrough on being removed from the chute 33. To provide for a greater capacity of bands to be marked by the machine 10, the chute 33 has an extension chute 38 secured thereto inclined downwardly in the direction of the chute 33 so that bands placed in the chute 38 will roll by gravity into the chute 33 where the band will eventually assume the position of the band 37 ready to be marked or imprinted upon. The forward wall 38 of chute 33 is slotted as at 40 to permit a spring wire 41 to enter therealong, the upper end of the spring wire 41 being held securely against the outside surface of the wall 38 by a plate 42 bolted to the chute 33 as at 43. The lower end portion of the spring wire 41 is flexed inwardly, extending along and within the slot 40 with its terminal end thereof in a groove 44 formed in the pin 32 and in contact with the lowermost band 37 urging the latter in contact relation with the plate member 30. As is explained hereinafter, the lowermost band 37 finds itself mounted on the pin 32 prior to the marking of the band 37 thereby placing the band 37 in a predetermined position for proper marking and also prevents the band lowermost in the chute 33 from becoming crushed or deformed during the marking thereof. A guard 45 mounted on the outward face 38 of the chute 33 straddles the slot 40 at the lower end of the spring wire 41 to compel the spring wire 41 to return to its normal position along the slot 40 and the terminal end of the spring wire 41 to its position in the groove 44 in the pin 32.

After the lowermost band 37 has been marked, it is ejected in order to permit the next band to be placed in proper position to be marked. This is done by a lever 47 pivotally mounted as at 48 on a fulcrum or post 49 secured to the standard 11, the lever 47 abutting against the block member 27 at one end and a sliding cam 50 at the other end. The lever 47 is maintained in contact with the block member 27 by a spring 51 extending between the lever 27 and a post 52 mounted on the base member 13. The cam 50 is actuated by a link 53 to which the cam 50 is secured at one end, its other end being pivotally secured to one end of a lever 54 which is pivotally mounted as at 55 to the base member 12. See Figure 3. The other end 56 of the lever 54 extends over the mid-portion of the base member 12 in the path of a reciprocating carriage 57 mounted in an undercut slot 58 formed longitudinally along the base member 12. It can be seen that as the carriage 57 moves to the left as shown by Figure 3, the left end of the carriage 57 will strike the end 56 of the lever 54 and compel the lever 54 to swing in a clockwise direction carrying the link 53 and cam 50 to the right, thus compelling the lower end of the lever 47 (see Figure 4) to swing away from the standard 11 while its upper end swings toward the standard 11 against spring pressure 51 causing the head 27, rods 24 to slide in the direction of the standard 11 against the force of the springs 28. Both the head 26 and chute 33 which are attached to the other ends of the rods 24 likewise slide outwardly in the direction away from the head 16. (See Figure 5.) However, the pin 32 which is secured to the head 16, is stationary. As the chute 33 slides outwardly, the bands in the chute 33 including the lowermost band 37 are carried along with the chute 33. (See Figures 9 and 10.) The lowermost band 37 which previously was mounted on the stationary pin 32 is slipped off the pin 32 and on to a rod 59 which is mounted horizontally and in alignment with the pin 32 by clamps 60 secured to supports 61. In order to prevent the lowermost band 37 which had just been slipped off the pin 32 onto the rod 59 from leaving the rod 59 as the chute 33 slides back to its normal position against the head 16, a resilient member 62 is provided with one end mounted on a bracket 63 secured to a support 61 and extending below the rod 59 with the other end 54 which is arcuate in shape is in contact relation with the free end of the rod 59. The arcuate tip 64 of the resilient member 62 permits the band 37 to slide out of the chute 33 onto the rod 59, but a shoulder 65 on the tip 64 prevents that band 37 from sliding backwardly off the end of the rod 59 in the direction of the chute 33. The shoulder 65 performs this function by engaging the inner edge of the band 37 and holding the band 37 on the rod 59 as the chute 33 and head 26 return to their starting position against the head 16 as seen by Figure 4.

Means are provided for effecting the reciprocating movement of the carriage 57 on the base member 12 comprising a motor 66 connected to a speed reduction gear box 67 by a belt 168, from which box a shaft 68 extends. A crank 69 is secured to the shaft 68 at one end and pivotally mounted to a link 70 at its other end which is connected to one end of a lever 71. The lever 71 is pivoted as 72 on a support 73 secured to the bottom wall of the base member 12 with its other end pivotally secured to a pair of links 74 connected to the rear portion of the carriage 57.

From the above description of the carriage reciprocating mechanism it can be noted that when the motor 66 has been energized from a source (not shown) the shaft 68 and crank 69 will rotate slowly causing the arm 70 to reciprocate back and forth and the lever 71 to swing about the pivot pin 72 thereby moving the carriage 57 back and forth on the base member 12. Mounted on the carriage 57 is a conventional die holder 75 shown in dotted lines since it forms no part of the present invention. The die holder 75 is an automatic numbering device such as one manufactured and sold by the Numberall Stamp & Tool Co. of Staten Island, N.Y. It consists of a head on which are mounted numbers and letters consecutively arranged so that any desired combination of letters and numbers may be imprinted or marked on the bands 37. As the die holder 75 moves in the direction of the chute 33 from the right as viewed in Figure 2, the die (not shown) comes into contact with the lowermost band 37 imprinting the desired lettering and numbers thereon. Since the markings on the bands are accomplished by the die cutting into the side wall of the bands, a considerable upward pressure is exerted on chute 33 and pin 32 which force is absorbed by a backing member 76 slidably mounted in a cavity 77 formed in the head 16, adjacent the chute 33. The backing member 76 rests on a shoulder 78 at the lower portion of the cavity 77 and extends therebeyond with a pair of rollers 79 mounted on the backing member 76 in contact with the block member 26. Downward pressure may be maintained on the backing member 76 by a threaded jack 80 extending upwardly of the backing member 76 and threaded through a bore 81 in the head 16 above the cavity 77. The backing member 76 absorbs the upward thrust of the die holder 75 at the moment the die thereon is in contact with the lowermost band 37 while marking same as the carriage 57 moves in the direction of the end 56 of the lever 54. Thereupon, the band ejecting mechanism is actuated as described above, and the imprinted band is placed on the rod 59. At this time the carriage 57 and die holder 75 has reached its extreme left position as viewed in Figure 2.

Now as the carriage 57 begins to slide to the right, the chute 33 commences to return in the direction of the head 16 leaving the last imprinted band 37 on the rod 59 engaged by the shoulder 65. When the chute 33 has moved a distance equal to the width of the bands being marked, the previously marked band 37 will have left the chute 33 through the opening 39 and is left remaining on the rod 59. The band which was previously the one above the lowermost band 37 will move downwardly in the chute 33 into the arcuate seat 36 at the bottom of the slot 40. As the chute 33 nears its position against the head 16, the now lowermost band receives the pin 32 with the spring wire 41 engaging the outer edge of the band and forcing it inwardly against the plate member 30. When the carriage 57 along with the die holder 75 has reached its extreme position at the right as viewed in Figure 2 the chute 33 will have returned to its ready position to effect the marking of the next band with the block member 26 in abutting relation with the head 16.

If it is desired to mark bands having a slightly different width and diameter yet use the same chute, all that need be done is remove the pin 32 for a pin which will fit into the new band to be imprinted. Also, the plate member 30 is removed and replaced by a plate member of sufficient thickness so that the new band when abutting against the new plate member 30 will extend to the forward wall 38 of the chute 33. In other words, though the width of the chute 33 may be larger than the length of the bands, the lowermost band will fit snugly at the bottom of the chute 33 between the outer wall 38 and the plate member 30 in order that the markings on the bands will be properly placed.

With the device 10 as shown and described herein and the proper plate member 30 positioned on the block 26, bands are placed in the chute extension 38 where they will roll into chute 33 and form a vertical column in the slot 35 all lying with their axes in parallel relation with the pin 32. Upon energizing the motor 66, the carriage 57 with the die holder 75 mounted thereon will commence to slide in the direction of the chute 33. There being no band on the pin 30, no band is marked on the first run, the carriage 57 moving into contact with the lever 54 thereby actuating the ejecting mechanism as described hereinabove. The chute 33 is made to slide outwardly and the lowermost band in the chute 33 will slip down into engagement with the pin 32 as the carriage 57 returns to its starting position as shown by Figure 2. When the die holder 75 now moves toward the chute 33, the lowermost band 37 on the pin 32 will become marked by the die on the die holder 75. On the return movement of the die holder 75, the now marked band will be ejected onto the rod 59 and the next lowest band in the chute 33 will find itself on the pin 32 ready to be marked. This cycle of operation is continued until a sufficient number of marked bands have been placed on the rod 59. If a new series of bands are to be marked, the previously marked bands are pushed along the rod 59 beyond the first clamp 60 by merely lifting the upper portion of the clamp 60 and the bands become positioned between the clamps 60, 60. The new bands now being deposited on the rod 59 will remain separated from the previously marked bands. As many supports 61 as are required may be used so that the machine 10 may be utilized at maximum efficiency.

What I claim as new is:

1. An automatic band marking machine comprising support means, vertically disposed chute means for receiving bands, slidable means mounting said chute means for substantially horizontal movement on said support means, means for actuating said slidable means, a stationary pin mounted on said support means extending forwardly into said chute means extending into a lowermost of said bands in said chute, means for performing an operation on said lowermost band as the latter is engaged by said stationary pin, said stationary chute having an opening at its lower end through which said operation performing means is adapted to project, said chute means having an opening in substantially horizontal alignment with said pin to permit the discharge of said lowermost band, band receiving means mounted in the path of said sliding chute and in spaced and forward relation to said pin and said opening for removing said band from said chute when said chute is moved forwardly of said pin on said slidable means.

2. An automatic band marking machine comprising support means, vertically disposed chute means for receiving bands, slidable means mounting said chute means for substantially horizontal movement on said support means, means for actuating said slidable means, a stationary pin mounted on said support means extending forwardly into said chute means extending into a lowermost of said bands in said chute, means for performing an operation on said lowermost band as the latter is engaged by said stationary pin, said stationary chute having an opening at its lower end through which said operation performing means is adapted to project, said chute means having an opening in substantially horizontal alignment with said pin to permit the discharge of said lowermost band, band receiving means mounted in the path of said sliding chute and in spaced and forward relation to said pin and said opening for removing said band from said chute when said chute is moved forwardly of said pin on said slidable means, carriage means adapted to support a band marking support member slidably mounted on said support means below said chute means, and power actuated means operatively connected to said carriage means for reciprocating movement of said carriage means along said support means below said chute means for marking said lowermost band in said chute.

3. An automatic band marking machine comprising support means, vertically disposed chute means for receiving bands, slidable means mounting said chute means for substantially horizontal movement on said support means, means for actuating said slidable means, a stationary pin mounted on said support means extending forwardly into said chute means extending into a lowermost of said bands in said chute, means for performing an operation on said lowermost band as the latter is engaged by said stationary pin, said stationary chute having an opening at its lower end through which said operation performing means is adapted to project, said chute means having an opening in substantially horizontal alignment with said pin to permit the discharge of said lowermost band, band receiving means mounted in the path of said sliding chute in spaced and forward relation to said pin and said opening for removing said band from said chute when said chute is moved forwardly of said pin on said slidable means, carriage means adapted to support a band marking support member slidably mounted on said support means below said chute means, power actuated means operatively connected to said carriage means for oscillating said carriage means along said support means, and means operatively connected to said actuating means and said power actuated means for sliding said chute means in synchronization with said reciprocating carriage means.

4. An automatic band marking machine comprising a support, a head adjustably mounted on said support, a vertically disposed chute for receiving bands in a substantially vertical tier, slidable means mounting said head to said chute for moving said chute in a substantially horizontal direction, a stationary pin mounted on said head and extending forwardly into said chute into the lowermost band in said tier, said chute having an opening in a forward portion in alignment with said pin for discharging said lowermost band from said chute, means for performing an operation on said lowermost band as the latter is engaged by said stationary pin, said stationary chute having a further opening at its lower end through which said operation performing means is adapted to project, and means mounted in alignment with said opening in spaced relation to and forwardly of said pin for removing said band from said chute through said opening.

5. An automatic band marking machine comprising a support, a head adjustably mounted on said support, a vertically disposed chute for receiving bands in a substantially vertical tier, slidable means mounting said head to said chute for moving said chute in a substantially horizontal direction, a stationary pin mounted on said head and extending forwardly into said chute and into the lowermost band in said tier, said chute having an opening in a forward portion in alignment with said pin for discharging said lowermost band from said chute, means for performing an operation on said lowermost band as the latter is engaged by said stationary pin, said stationary chute having a further opening at its lower end through which said operation performing means is adapted to project, and means mounted in alignment with said opening in spaced relation to and forwardly of said pin for removing said band from said chute through said opening and means operatively connected to said sliding means for reciprocating said chute to and from said head and said band removing means.

6. An automatic band marking machine comprising a support, a head adjustably mounted on said support, a vertically disposed chute for receiving bands in a substantially vertical tier, slidable means mounting said head to said chute for moving said chute in a substantially horizontal direction, a stationary pin mounted on said head and extending forwardly into said chute and into the lowermost band in said tier, said chute having an opening in a forward portion in alignment with said pin for discharging said lowermost band from said chute, means for performing an operation on said lowermost band as the latter is engaged by said stationary pin, said stationary chute having a further opening at its lower end through which said operation performing means is adapted to project, means mounted in alignment with said opening in spaced relation to and forwardly of said pin for removing said band from said chute through said opening, means operatively connected to said sliding means for reciprocating said chute to and from said head and said band removing means, a carriage slidably mounted below said head and said chute, said carriage adapted to support a band marking support member for marking said bands, and further means operatively connected to said power operated means for reciprocating movement of said carriage.

7. An automatic band marking machine comprising a standard, a head adjustably secured to said standard, a carriage adapted to support a band marking support member slidably mounted below said head, power operated means secured to said carriage for reciprocating movement of said carriage below said head, said head having a substantially horizontally disposed bore, rod means extending through said bore, a substantially vertically disposed chute for receiving bands in a vertical tier positioned adjacent said head, means securing one end of said rod means to said chute, spring means urging said chute into contact relation with said head, lever means connected to said power operated means for sliding said chute forwardly away from said head against said spring means, a pin extending into the lowermost band in said chute mounted on said head and extending through said chute, said pin having a groove, said chute having an opening at its forward portion and in alignment with said pin to permit the discharge of the lowermost band, a band receiving rod, support means mounting one end of said band receiving rod in alignment with said opening and in alignment and in spaced relation to said pin whereby said band is received by said band receiving rod upon the sliding of said chute away from said head, a resilient member mounted on said support and terminating adjacent said one end of said band receiving rod, said resilient member having a shoulder for engaging the lowermost band upon the sliding of said chute in a direction toward said head to prevent said band from leaving said band receiving rod.

8. An automatic band marking machine comprising a standard, a head adjustably secured to said standard, a carriage adapted to support a band marking support member slidably mounted below said head, power operated means secured to said carriage for reciprocating movement of said carriage below said head, said head having a substantially horizontally disposed bore, rod means extending through said bore, a substantially vertically disposed chute for receiving bands in a vertical tier positioned adjacent said head, means securing one end of said rod means to said chute, spring means urging said chute into contact relation with said head, lever means connected to said power operated means for sliding said chute forwardly away from said head against said spring means, a pin extending into the lowermost band in said chute mounted on said head and extending through said chute, said pin having a groove, said chute having an opening at its forward portion and in alignment with said pin to permit the discharge of the lowermost band and a vertically disposed slot at its lower portion, a spring wire secured at its upper end to said chute with its lower end disposed in said groove of said pin at said slot, said lower end of said spring wire for engaging the lowermost band for yieldingly maintaining said band in said chute, a band receiving rod, means mounting one end of said band receiving rod in alignment with said opening and in alignment and in spaced relation to said pin whereby said band is received by said band receiving rod upon the sliding of said chute away from said head, a resilient member mounted on said support and terminating adjacent said one end of said band receiving rod, said resilient member having a shoulder for engaging the lowermost band upon the sliding of said chute in a direction toward said head to prevent said band from leaving said band receiving rod.

References Cited in the file of this patent

UNITED STATES PATENTS

| | | |
|---|---|---|
| 2,313,828 | Lehmann | Mar. 16, 1943 |
| 2,425,374 | Kagley | Aug. 12, 1947 |
| 2,429,496 | Sutter | Oct. 21, 1947 |
| 2,636,434 | Wood | Apr. 28, 1953 |